United States Patent
Sultan et al.

(10) Patent No.: US 8,547,982 B2
(45) Date of Patent: Oct. 1, 2013

(54) WIRELESS SENSOR NETWORK WITH ENERGY EFFICIENT PROTOCOLS

(75) Inventors: Farooq Sultan, Dhahran (SA); Salam A. Zummo, Dhahran (SA); Munir A. Kulaib Al-Absi, Dhahran (SA); Ahmar Shafi, Dhahran (SA)

(73) Assignees: King Fahd University of Petroleum and Minerals, Dhahran (SA); King Abdulazia City for Science and Technology, Riyadh (SA)

( * ) Notice: Subject to any disclaimer, the term of this patent is extended or adjusted under 35 U.S.C. 154(b) by 106 days.

(21) Appl. No.: 13/304,201

(22) Filed: Nov. 23, 2011

(65) Prior Publication Data
US 2013/0128786 A1   May 23, 2013

(51) Int. Cl.
*H04L 12/28* (2006.01)

(52) U.S. Cl.
USPC ............................ 370/400; 370/311; 370/328

(58) Field of Classification Search
USPC .............. 370/400, 310, 310.2, 311, 312, 252, 370/328, 332, 333, 338, 349
See application file for complete search history.

(56) References Cited

U.S. PATENT DOCUMENTS

| | | | |
|---|---|---|---|
| 6,735,448 B1 * | 5/2004 | Krishnamurthy et al. | 455/522 |
| 7,058,018 B1 * | 6/2006 | Hasty et al. | 370/250 |
| 7,436,789 B2 | 10/2008 | Caliskan et al. | |
| 7,839,764 B2 | 11/2010 | Jiang et al. | |
| 2006/0178150 A1 | 8/2006 | Kim | |
| 2008/0129494 A1 | 6/2008 | Kim et al. | |
| 2009/0141666 A1 | 6/2009 | Jin et al. | |
| 2009/0310572 A1 | 12/2009 | Wang et al. | |
| 2010/0302933 A1 | 12/2010 | Sreenan et al. | |
| 2011/0084800 A1 | 4/2011 | Ko et al. | |

* cited by examiner

*Primary Examiner* — Brenda H Pham
(74) *Attorney, Agent, or Firm* — Richard C Litman

(57) ABSTRACT

The wireless sensor network with energy efficient protocols includes a network of external sensors in communication with a data sink. The network utilizes an algorithm integrating a modified S-MAC (an algorithm for medium access control) protocol for decreasing energy usage in operating the node and associated sensors. A routing protocol is further integrated into the algorithm, the routing protocol being based upon cluster head rotation.

5 Claims, 9 Drawing Sheets

WIRELESS SENSOR NETWORK WITH ENERGY EFFICIENT PROTOCOLS

BACKGROUND OF THE INVENTION

1. Field of the Invention

The present invention relates to wireless protocols and networks, and particularly to a wireless sensor network with energy efficient protocols.

2. Description of the Related Art

To ensure proper operation of a wireless sensor network (WSN), efficient power consumption must be ensured throughout the network. In addition, self-healing ability of the network, cost efficiency and flexible network architecture must also be provisioned to enable seamless operation of the network. Power consumption is the most important design factor for WSNs. Conserving power at each node, eventually reads to the extension of the overall network life. On the hardware front, efficient design of the node could serve as a major factor in deciding the power consumption figures. At the application level, power conservation can be incorporated into the design of the protocols by introducing novel design and implementation procedures that take the energy reserves into account. For example, minimizing the number of collisions or choosing the shortest path to the destination can help save power.

A major part of the power is wasted during transmission and reception of radio packets. Since transmission and reception is inevitable, short distance transmission and simple circuitry for modulation/demodulation can be employed to save power. It is important to know the causes of energy wastage so that appropriate action must be taken to overcome or reduce them. In WSNs energy wastage occurs in three domains, namely, sensing, data processing and communications. However, the losses during communications are considered to be the major factor of the network life. The different causes of energy wastage have been identified and discussed in the following text.

Packet collisions cause nodes to retransmit, which, in turn, results in wastage of the battery power. A collision occurs when multiple nodes transmit at the same time. Since all the nodes share the same channel, collision avoidance must be ensured for proper delivery of packets within the network. The situation becomes even worse when multiple packets start to arrive at a receiving node simultaneously.

Overhearing means that a node starts receiving packets that are not destined for it. In normal operation, a node receives a packet and then starts to parse it. In this process, the node determines the destination address in the packet header and discards it if the receiving node is not the destination of the packet. The time required to complete this process depends on the length of the packet header and also on the location of the destination address in the header.

The main objective of the WSN is to relay information to the sink. Control packets are, however, necessary for establishing and maintaining efficient performance of the system. A large number of control packets decreases the effective data throughput of the network, and also causes an increase in energy dissipation. So there is a tradeoff between the number of control packets that need to be sent and the throughput of the network. Ideally, control packets should be sent when absolutely necessary to ensure that the network is productive with respect to data packets.

The network must have a high level of fault tolerance in order to be of any practical value. In the setup of a WSN, the nodes are scattered so that the sensed parameters reported by individual nodes represent the situation at different physical locations. Usually individual nodes cannot directly communicate with the sink node. In such cases, data must be relayed through intermediate nodes until it reaches the sink. In case of failure of multiple nodes in the network, the data should still reach the sink node by re-routing or variable power adjustment methods. In short, failure of individual nodes should not affect the operation of the network.

WSNs may include hundreds if not thousands of sensor nodes. New nodes may join the network and older nodes may die out without informing the administrator. In such scenarios, the network must be flexible enough to occupy the changes and to accommodate the variable size while maintaining an acceptable level of integrity.

The deployment cost is a very important design factor for sensor networks because of the large number of nodes required, as well as the fact that in most networks the nodes are disposable. The cost includes both the hardware and the software required to monitor the network.

The limited power supply of the nodes makes it inevitable to use energy conservation techniques to design the network that lasts a longer period of time. It is, therefore, important to know the causes of energy wastage so that appropriate action must be taken to overcome or reduce them.

Once the packets collide, the data gets corrupt. Such packets have to be discarded, and retransmissions have to be requested, increasing the energy consumption in the network. Moreover, when the control packets collide, the complete network setup is affected. The delay in packet delivery also increases due to collisions. As an indirect consequence of retransmissions, the effective throughput of the system decreases, since the majority of the time is wasted in retransmissions.

Overhearing wastes valuable energy in reading and receiving packets that are not intended for the desired node. Moreover, until the completion of this process, all the other packets intended for the node are not received, thus increasing the latency in the network and resulting in collisions.

Over-emitting causes high power dissipation and must be avoided by time synchronization schemes or scheduling. Although the losses in idle listening are not severe, they must also be minimized to increase the network lifetime.

Thus, a wireless sensor network with energy efficient protocols solving the aforementioned problems is desired.

SUMMARY OF THE INVENTION

The wireless sensor network with energy efficient protocols includes a wireless node using an off-the-shelf variety of different sensors and components that can support them. The node includes a high performance MCU (Microcontroller Unit) with a double-sided design to reduce the size to a minimum. The use of special stub antennas further decreases the overall height of the node. On the software front, a MAC (Medium Access Control protocol) layer protocol inspired from S-MAC (Sensor-MAC) has been modified with some unique implementation procedures not mentioned in literature. Useful features of both TEEN (Threshold sensitive Energy Efficient sensor Network routing protocol) and LEACH (Low Energy Adaptive Clustering Hierarchy routing protocol) have been combined into a new protocol that employs a cluster head approach, and at the same time is suitable for dynamic environments, in addition to the incident-based Unsynchronized Group of Nodes (UGN). Dynamic head shifting is employed to increase the lifetime of the network. The system defines a total of eleven (11) cluster levels so that the system can support large sizes of networks with small multi-hop routed communications among the cluster heads (CHs), thus saving power for transmission.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
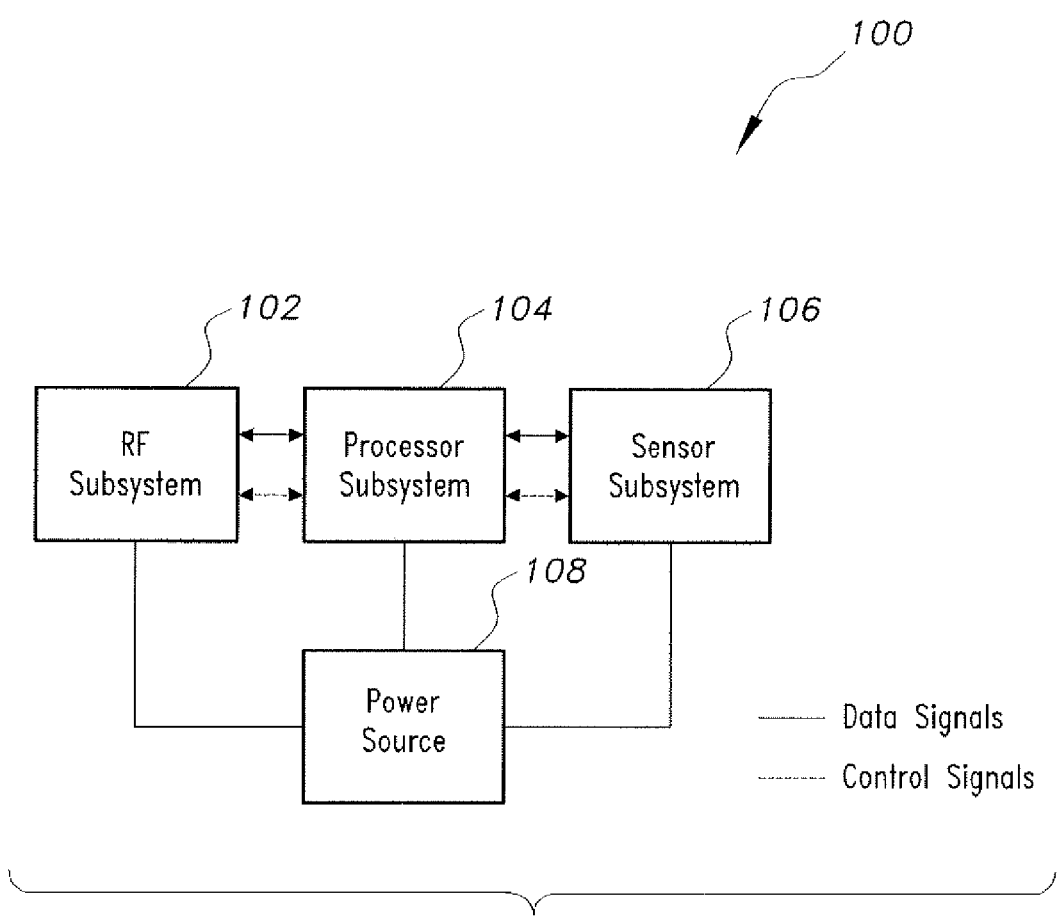
FIG. 1 is a block diagram of a wireless sensor node in a wireless sensor network with energy efficient protocols according to the present invention.

The wireless sensor network with energy efficient protocols includes a wireless node using off-the-shelf sensors and components that can support a plurality of different sensors. The node includes a high performance microcontroller unit (MCU) with a double-sided design to reduce the physical size to a minimum. The use of special stub antennas further decreases the overall height of the node.

At the outset, it will be understood that the diagrams in the Figures depicting the wireless sensor network with energy efficient protocols are exemplary only, and may be embodied in a dedicated electronic device having a microprocessor, microcontroller, digital signal processor, application specific integrated circuit, field programmable gate array, any combination of the aforementioned devices, or other device that combines the functionality of the wireless sensor network with energy efficient protocols onto a single chip or multiple chips programmed to carry out the method steps described herein, or may be embodied in a general purpose computer having the appropriate peripherals attached thereto and software stored on a non-transitory computer readable media that can be loaded into main memory and executed by a processing unit to carry out the functionality of the apparatus and steps of the method described herein.

The node elements group themselves into clusters and decide a cluster head (CH) that communicates with its peers to route data. The protocol includes (CH)s that are rotated periodically in a pre-defined manner to facilitate energy dissipation of the nodes. The nodes form fixed clusters, and they retain their membership till the end. This not only simplifies the implementation, it also results in a savings of energy from the overhead of communication required for making new clusters. The MAC protocol described herein assumes that all the nodes can receive signals from the sink, which can become difficult in different environments. The preprogrammed thresholds can become difficult to change as priorities for alarms change.

The system settings can be modified very easily in the system software at any time, depending upon the particular requirements of the application for which the WSN is being employed. All nodes are identical and act both as a sensing node and as a cluster head (CH) on their turn. The network topology is cluster-based. A data sink node broadcasts a beacon signal every four seconds. At startup, every node waits for five seconds before deciding whether it should declare itself as a new cluster head, or whether it should join an existing cluster as a member.

Useful features of both TEEN and LEACH have been combined into a new protocol that employs the aforementioned cluster head approach, and at the same time is suitable for dynamic environments, in addition to the incident-based Unsynchronized Group of Nodes (UGN). Dynamic head shifting is employed to increase the lifetime of the network. The system defines a total of eleven (11) cluster levels, and thus can support large sizes of networks with small multi-hop routed communications among the CHs, thus saving substantial power for transmission.

The data acquisition part of a WSN comprises a large number of tiny wireless devices called nodes, which are deployed over a physical environment and actively cooperate in order to accomplish one or more tasks.

As shown in FIG. 1, a typical sensor node 100 includes a power supply 108, sensors 106, a microcontroller unit (MCU) 104, and a transceiver 102 to send and receive data. The power supply 108 is used to power the node. The sensor circuitry can transform physical quantities into an electric signal. An analog-to-digital converter (ADC), typically a part of the MCU 104, changes the analog signals generated by the sensors into digital signals and sends them to the processing portion of subsystem 104. The processor can then perform simple operations on the received digital signal and can store it into memory. Finally, the transceiver 102 sends and receives data to different destinations as and when required. The sensor nodes relay their sensed data through each other or directly to the base station, depending on the scale of the network and their position with respect to the base node.

The WSN protocols involve a cluster head approach, which provides any given sensing node with only a single relay (cluster head), so that the number of hops between the sensing node and the destination are decreased, thereby effectively decreasing overall packet latency. The base station may send control commands (downstream messages) down into the networks, for example, a request to increase their sampling frequency. Sensors are designed to support unattended operation for long durations, frequently in remote areas, in smart buildings, or even in hostile environments. A set of sensing components forms a part of the device. Popular examples of sensing components include temperature sensors, accelerometers, humidity sensors, infrared light sensors, pressure sensors, and magnetic sensors, as well as chemical sensors. WSNs have applications in all fields, such as structural monitoring, environmental monitoring, and object tracking. Owing to the hostility and remoteness of the operating region, some critical factors for the efficient operation of a WSN include power efficiency for longer network life, fault tolerance for network integrity, scalability for variable network topologies and dynamic network setup, which are just some of the desirable features for a practical WSN.

A data distribution part of the network is responsible for collecting the data from the base station node and distributing it through different media. WiFi, LAN and even long distance radio communication techniques are used to accomplish this task. The work done by the present invention is at the data acquisition level of the WSN. Designs at hardware level (sensor node) as well as protocol level are done to ensure cost as well as energy efficiency.

The inventive protocols are aimed at increasing the network operating time. To fulfill this requirement the selected medium access control (MAC) and routing protocols must be energy efficient and should have the ability to provide an acceptable data throughput for the network to be meaningful.

The routing protocols include cluster-based hierarchical protocols that have proved to provide a much better data throughput for large networks having hundreds of nodes. The issue of selecting a permanent cluster head leads to higher energy dissipation and therefore a reduced network life; since the death of the cluster head causes issues in the selection of the new cluster head. When the cluster head runs out of power, until the selection of the new cluster head, the cluster remains out of touch from the rest of the network and in doing so leads to multiple packet loss. The system streamlines the head selection procedure so that the network is not disrupted while providing an acceptable level of end-to-end throughput.

The implementation of the designed protocol on hardware presents multiple challenges. Although the design details are presented in detail in literature, no mention of implementation process is done. Due to the unavailability of implementation details, unique methods must be devised while ensuring the network operation is not compromised.

In order to deploy a WSN in a given area, the least number of nodes required to cover a major part of the area must be determined. Since the number of nodes is directly related to the cost of the network, the process becomes a crucial' part of the network deployment stage.

WSN can be deployed in buildings to monitor live activities like temperature/humidity and in turn operate the heating/cooling equipment depending upon the sensed values. In addition, intrusion detection can be accomplished to enhance the security situation of a locality. Intelligent buildings employing systems like BACnet are examples of this approach.

WSNs have been used to monitor environmental phenomenon such as, e.g., volcanic activity to alert evacuation teams beforehand. This type of system has also been used to monitor temperature/humidity condition in tea plantations to operate the irrigation system autonomously.

WSNs in the form of body area networks (BANs) have been used to monitor health activity of patients remotely. The network gathers the vital information and sends it to the doctor over the Internet. Thus, the doctor has the complete up to date information about the patient without any dedicated monitoring.

An existing medium access protocol called the sensor medium access control (S-MAC) has been used for ad-hoc WSNs. This protocol depends on the request-to-send (RTS)/clear-to-send (CTS) mechanism of the IEEE 802.11 to avoid collisions. It was shown that S-MAC has 2-6 times less power consumption than IEEE 802.11. Timeout MAC (TMAC) protocol exists and has been proposed to solve the problem of idle listening in a wireless sensor network. The T-MAC dynamically adapts a listen/sleep duty cycle through finely grained timeouts, while having minimum complexity. Both S-MAC and T-MAC operate on the principle of adopting sleep-wake schedules to synchronize the wake timings of all the nodes within a vicinity.

To further reduce the energy wastage due to idle listening, low power listening (L.PL.) has been employed to reduce the duty cycles to less than 0.1%. WiseMAC and B-MAC are examples of an LPL implementation. In LPL nodes wake up for a very brief period to check the channel activity without actually receiving data. This is called channel polling. There also exists a Power control mechanism based on S-MAC protocol and modifies the competitive mechanism of S-MAC resulting in enhanced S-MAC (ET-MAC). The energy-efficient and high throughput MAC (ET-MAC) protocol embeds some extra information in long wake up preamble frame and it also uses collision avoidance signaling and handshaking. These ideas help wireless nodes to stay at sleep node as much as possible. Their simulation results and analysis showed that with dynamic traffic load, this protocol achieves improvement in energy-efficiency.

For multiple access control collisions are avoided by virtual and physical carrier sense (CS). There is a duration field in each transmitted frame that indicates how long the remaining transmission will be for. If a node receives a packet destined to another node, it knows how long to keep silent from this field. The node records this value in a variable called the network allocation vector (NAV) and sets a timer for it. Every time when the timer fires, the node decrements its NAV until it reaches zero. Before initiating a transmission, a node first looks at its NAV. If its value is not zero, the node determines that the medium is still busy. This is called virtual carrier sense. Physical carrier sense is performed at the physical layer by listening to the channel for possible transmissions. Carrier sensing time is randomized within a contention window to avoid collisions and starvation. The medium is determined as free if both virtual and physical carrier sense indicates that it is free. All sender nodes perform carrier sense before initiating a transmission. If a node fails to get the medium, it goes to sleep and wakes up when the receiver is free and listening again. Unicast packets follow the sequence of RTS/CTS/DATA/ACK between the sender and the receiver. After the successful exchange of RTS and CTS, the two nodes will use their normal' sleep time for data packet transmission. In order to explain this protocol some assumptions have been considered. This protocol assumes that all the nodes in the network are stationary and are able to transmit at variable levels of power. The nodes are deployed randomly and have the ability to communicate with neighboring nodes. To conserve energy, most of the data communications is done between neighbors rather than between end points. This means, to transmit data between two locations, nodes transmit to their neighbors and the data reaches the destination over a multi-hop path. The nodes are assumed to operate dedicated applications that result in the activity being reported. This enables the nodes to be hard-coded rather than generally programmed. Every node has the ability to aggregate redundant data before transmission to avoid congesting the network by sending copies of the same packet. The applications are assumed to tolerate some level of latency since environmental monitoring will have long idle periods followed by data bursts in case of alarm.

Threshold sensitive Energy Efficient sensor Network protocol (TEEN) is a hierarchical protocol' designed to be responsive to sudden changes in the sensed environmental attributes such as temperature. Responsiveness is important for time critical applications, in which the network operates in a reactive mode.

The network architecture in TEEN is based on a hierarchical' grouping where closer nodes form clusters and this process goes on the second level until base station (sink) is reached. After the clusters are formed, the cluster head broadcasts two thresholds to the nodes. These are hard and soft thresholds for sensed attributes. The hard threshold is the minimum possible value of an attribute to trigger a sensor node to switch on its transmitter and transmit to the cluster head. Thus, the hard threshold allows the nodes to transmit only when the sensed attribute is in the range of interest, thus reducing the number of transmissions significantly. Once a node senses a value at or beyond the hard threshold, it transmits data only when the value of that attribute changes by an amount equal to or greater than the soft threshold]d. As a consequence, soft threshold will further reduce the number of transmissions if there is little or no change in the value of sensed attribute.

Figure 4:
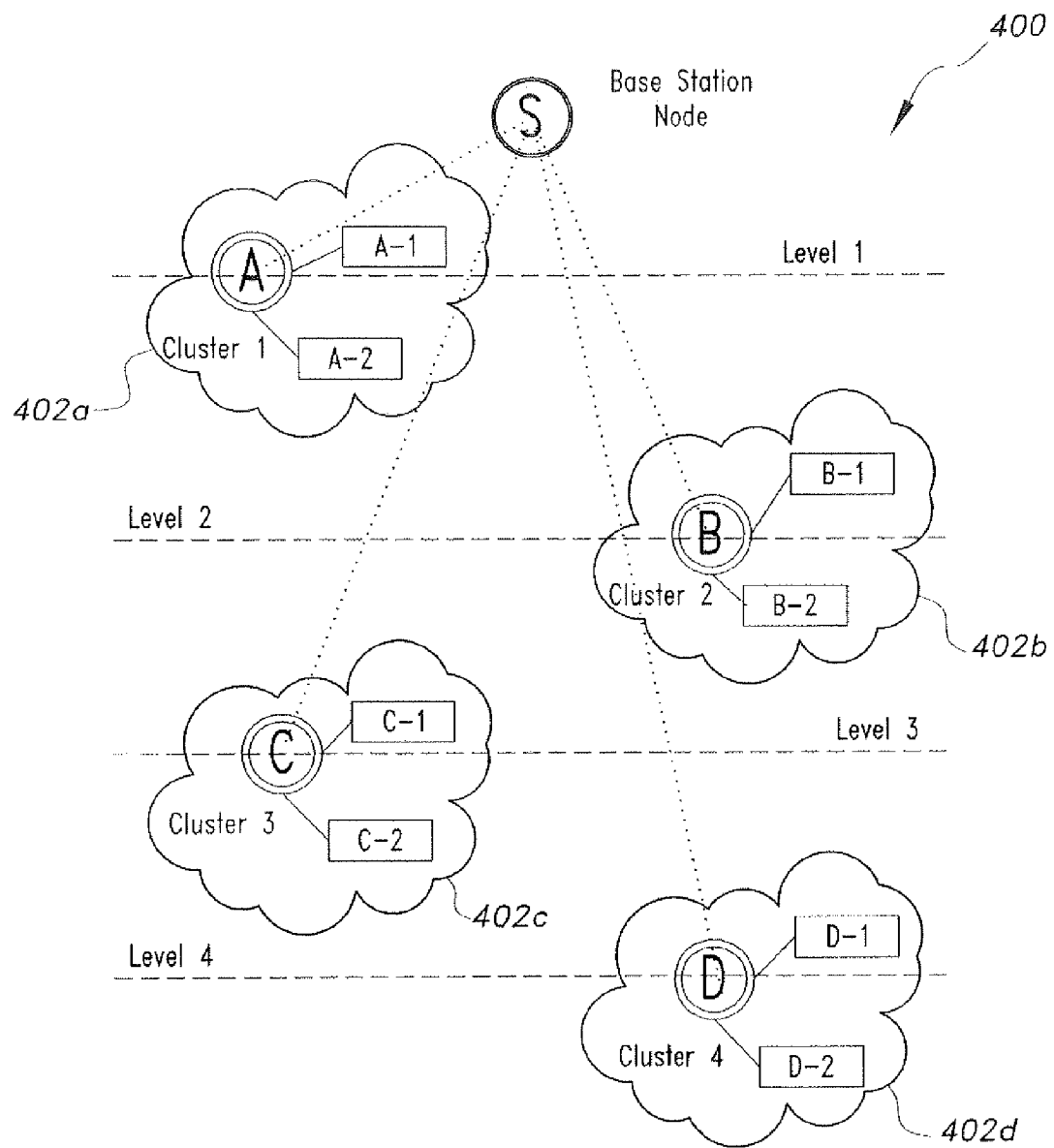
FIG. 4 is a block diagram showing the network topology of the wireless sensor network with energy efficient protocols according to the present invention.

This model uses hierarchical clustering scheme in which the nodes are classified into clusters (exemplary clusters 402a, 402b 402c, and 402d are shown in FIG. 4). Nodes are grouped into clusters and a cluster head is selected from amongst them. The selection of cluster head can be fixed but is usually taken as dynamic to distribute the energy consumption evenly throughout the network. Once the cluster head has been selected, the remaining nodes become its members. All the member nodes sense and forward the data to their respective cluster heads. Once the head node gets the data, it needs to forward it to the next head in the upper level. This process continues until the packet reaches the sink.

Hard threshold (HT) and soft threshold (ST) are defined by the user and serve as the limits of the forwarded data. HT defines the limit for the minimum sensed value after which the data should be transmitted, whereas ST defines the minimum difference between the sensed value and HT. By using HT and ST together, excessive transmissions are avoided.

LEACH belongs to the proactive family of routing protocols. The LEACH protocol enables all the nodes to sense at regular intervals, turn on the radios, transmit the information and go back to sleep. In other words, a snapshot of the sensed values is provided after a particular time.

Since sensor nodes may die randomly, LEACH employs the concept of dynamic clustering where the cluster memberships keep varying from time to time. LEACH is completely distributed and requires no global knowledge of the network, however, LEACH uses single-hop routing where each node can transmit directly to the CH and the sink. Therefore, it is not applicable to networks deployed in large regions. Furthermore, the idea of dynamic clustering brings extra overhead, e.g. head changes, advertisements etc., which may diminish the gain in energy consumption.

When the network is set up, the nodes are distributed into clusters. Once the clusters have been created, the head node transmits TDMA-based schedules to notify the member nodes of their respective time slots during which communication takes place. When all the nodes have sent the data to the cluster head, the head node aggregates the data and forwards to the cluster head in the second level. Due to time slots, the cluster heads has to be awake for a larger amount of time as compared to the member nodes. Also the aggregation of data requires processing, which in turn consumes valuable energy.

Due to the high energy dissipation at the cluster head, it is expected to die out early. To prevent this event from happening, the cluster head responsibility is rotated among the member nodes. This enables uniform energy consumption in the network ensuring that no single node dies out earlier.

Traditional WSN design focuses on improving energy efficiency and data throughput by adopting design methods for MAC and routing protocols, however, the energy consumed by the wireless node during the operation of the application is usually side lined. The approach adopted for the design and implementation of the MAC and routing protocols ensures energy efficiency on the application level by using programming platforms like TinyOS that insure a high degree of energy efficiency by limiting the resources being used.

The protocols have been simulated and fine-tuned before implementing them on actual hardware. The network has been tested with 30 nodes for a sufficient period of time to confirm the operation of the programmed protocols. In order to create a model to provide an approximation on the network size, received radio power measurements have been performed at two different locations. This data has been used to construct a model that can provide the approximate network size for a given region of interest.

The present system is a one-of-a-kind wireless sensor node that can be programmed by a cheap off-the-shelf programmer rather than using special sensor boards (MIB 510) as for the Crossbow Mica devices. Temperature and light sensors have been included on the node and extra ports have been provided to interface additional sensors if required.

A MAC layer protocol inspired from S-MAC has been implemented with some unique implementation procedures not mentioned in literature. LEACH and TEEN have been used as references to devise a routing protocol that serves the purpose of data routing as well as keeps the power consumption in check. An interactive network monitoring application has been created to observe the network conditions and to record the data for future usage. A network deployment application has been completed that estimates the approximate network size based on the environment and the target area.

The complete system has been tested with twenty-five nodes with several clusters at different levels from the sink node. The network performed well and remained stable throughout the experiment.

The wireless sensor network with energy efficient protocols utilizes a novel energy model that specifies activity-sleep requirements for node components.

The wireless sensor network with energy efficient protocols utilizes a highly power-efficient TinyOS operating system for application design. Moreover, the wireless sensor network with energy efficient protocols utilizes an ATmega128 supporting TinyOS. The ATmega128 is a low-power, high-performance 8-bit microcontroller offering 128 KB of in-system self-programmable flash program memory, 4 KB EEPROM, and 4 KB internal SRAM. It allows executing powerful instructions in a single dock cycle, achieving throughput approaching 1 million instructions per second (MIPS) allowing the system designer to optimize power consumption versus processing speed. It comes in surface-mount compact form factor, thus achieving smaller size circuit designs.

A mandatory requirement of the WSN design is to conserve the power in the sensor nodes. Hence, this microcontroller has support for different power save modes. Sleep modes enable the application to shut down unused modules of the MCU, thereby saving power. The ATmega128 provides six different power-save modes which includes an Idle Mode wherein the CPU stops but the SPI, analog comparator, ADC, two wire interface, timers/counters, watchdog and the interrupt system continue to operate normally. This mode also enables the MCU to wakeup from an external trigger.

An ADC Noise Reduction mode turns off the CPU but keeps the ADC, two-wire interface, interrupt counter and timer/counterO keep operating. This mode reduces the noise during ADC operation and also enables higher resolution measurements.

A Power-down mode turns off the CPU and the external oscillator while keeping the two-wire interface, external interrupts and the watchdog counter operating. This mode reduces the noise during ADC operation and also enables higher resolution measurements. The MCU can wakeup from this mode only from external interrupts.

A Power-save Mode is the same as compared to power down mode except that all the timers are also enabled. This enables the MCU to wakeup when timers/counters overflow.

A Standby Mode that is different from the power-down mode allows the oscillator to continue to run. This feature can be used when the oscillator is being used to time external circuitry attached to the MCU.

An Extended Standby Mode is similar to the power save mode with the exception that the oscillator keeps operational.

The wireless sensor network with energy efficient protocols utilizes nodes that require several buffers and require keeping track of different timing events. Preferably 32 general-purpose working registers, and a real-time counter (RTC), as well as four flexible timers/counters with compare modes are employed by the wireless sensor network with energy efficient protocols. The sensors preferably utilize 10-bit ADC with optional differential input stage with programmable gain.

Figure 2:
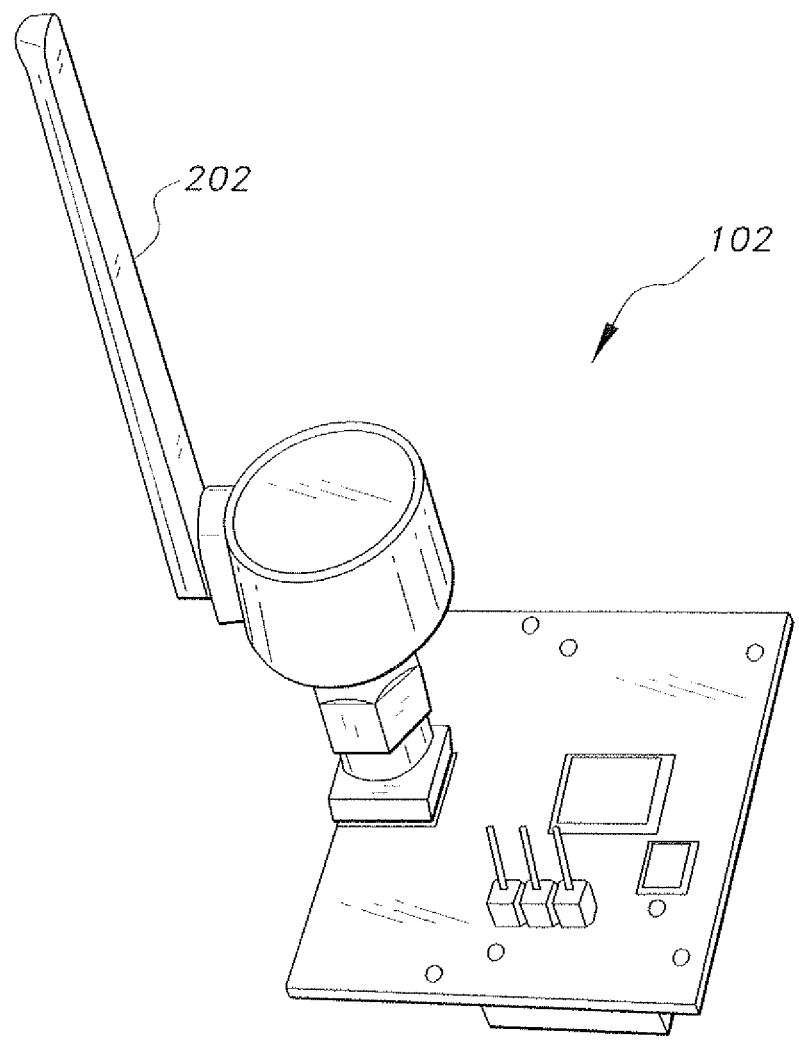
FIG. 2 is a perspective view of a transceiver module of the wireless sensor network with energy efficient protocols according to the present invention.

For RF subsystem, a CC2420 transceiver module 102 is used, as shown in FIG. 2. The component CC2420 is a 2.4 GHz radio frequency (HF) transceiver chip for low voltage, low power wireless applications, which is used to interface low cost microcontrollers and has very useful features such as the compact size as well as data buffering, encryption and authentication. It provides the capability of controlling the transmission power levels so as to meet the requirements of different scenarios of the WSN applications. Moreover, the transceiver module 102 includes a compact antenna 202

In addition, CC2420 provides burst transmissions, channel assessment, link quality indication and packet timing information. These features reduce the load in any host microcontroller. The CC2420 uses serial peripheral interface (SPI) to communicate with the microcontroller four wires serial. Additionally there are four extra lines out of the CC2420 to assist the microcontroller in monitoring the status of the wireless communication. It has 256 Bytes buffer for transmitting and receiving data. The CC2420 supports ZigBee with direct sequence spread spectrum (DSSS) transmission at 2 Mchips/sec and provides an effective data rate of 250 kbps. Moreover, CC2420 has the ability to adjust the transmission power levels as indicated in Table 1.

TABLE 1

Transmission Power Levels

| Power Level | Transmitted Power in dBm |
| --- | --- |
| 31 | 0 |
| 27 | −1 |
| 23 | −3 |
| 19 | −5 |
| 15 | −7 |
| 11 | −10 |
| 7 | −15 |
| 3 | −25 |

The wireless sensor network with energy efficient protocols can use a daughter board module CC242OEM. It is a Zigbee enabled RF transceiver with TinyOS support produced by Chipcon. This board has the CC2420 module with its configurations parts and circuits ready and soldered on a PCB with a 40-pins socket along with its antenna as shown in FIG. 2.

For the circuitry design all efforts have been made to reduce the size and weight of the sensor nodes by designing more efficient PCBs and using smaller components with better surface space utilization e.g. double sided PCBs. A smaller size antenna is preferable on the RF transceiver.

The wireless sensor network with energy efficient protocols can be equipped with two types of sensors for environmental monitoring, e.g., light and temperature. The light sensor may be installed onboard and the temperature sensor may be interfaced with the node via the expansion ports. Nodes sense the raw data and provide the corresponding analog voltage to the microcontroller that is converted to digital' format by the internal ADC of the microcontroller for the processing and later transmission by the RF transceiver to the neighboring nodes. Some of the features of the inventive wireless sensor network node are that it has a reduced area with double-sided PCB design structure. Moreover, the overall design is improved in that the dimensions are reduced to a 6.09 cm×4.19 cm area. A smaller, more compact antenna is used to reduce the effective height of the platform. In addition, the optimization in physical area is achieved by relocating some components and using comparatively compact passive components e.g. by using small size ⅛ Watt resistors instead of the standard ¼ Watt. The crystal oscillators are also used in a way so as to conserve the space.

The LEDs used in the new design are surface mount type and have smaller physical dimensions thus freeing up crucial space and saving the area of the node. The actual area of the ultimate functional node can be even smaller when the LEDs and their peripheral circuitry are removed as they are used in the prototype only for the debugging purposes to let us know the different states of the node during its operation. The current assignments of the LEDs include All OFF: Node in Sleep Mode, Green ON: Member Node awake, Blue ON: Node sending data, Red ON: Head node awake The wireless sensor network is a totally self-powered unit and has an onboard battery pack as the power source. All the wireless nodes in the network are identical in every aspect, except the sink/base node, and they are powered using batteries. Only the sink node is powered by commercial power via the USB port of the Network Monitoring Server. Moreover, an ON-OFF switch is embedded into the design to enable resetting the devices and to avoid the wastage of energy during testing. The wireless nodes are powered by 3 AAA sized (1.5 VDC) batteries providing a total supply of 4.5V. The wireless node has a set of extension ports that provides the capability to add external' sensors. Currently, the node houses onboard light sensor and has provision of installing temperature and humidity sensors on board using those extension ports. The wireless sensor network with energy efficient protocols has the option of an additional analog sensor and a digital sensor with a 4.5V power port also available for powering the sensors.

In addition to the wireless sensor nodes, one sink node is required to receive the data from the wireless network. This sink node has one of the purposes of collecting the data from the sensor nodes in the wireless network and forwarding it to a server so that proper analysis and actions of the data can be performed. Generally, it is assumed that the sink node has unlimited reserves of energy as it is connected to the commercial power supply. Moreover, the sink node is also used to synchronize all the nodes in the network by sending a beacon signal at regular intervals.

The sink node connects serially to a PC USB port using a serial-to-USB connection type converter. Connecting via serial port requires the conversion of the local circuit voltages (known as TTL level) to higher levels (R.S-232) so that serial ports can understand the data being received. MAX232CPE by MAXIM Corporation is an example of a voltage level converter. This IC when connected along with peripheral circuitry converts the circuit level voltages (=5V) to serial eve (=15V) and vice versa. This enables the wireless sensor network with energy efficient protocols to connect the base station with the PC through the serial port. Once the connection is made, the serial port is read through software to view the incoming packets.

In the wireless sensor network with energy efficient protocols, each node plays a member role (of the cluster) and a head role of the cluster. To save the power of the battery both these types of nodes do not sense and transmit the data continuously, instead, they wake up for a small period of time and then sleep. Head nodes wake up for a little more time as compared to member nodes. Head nodes also receive data from member nodes and then transmit towards the sink node, whereas member nodes wake up for lesser time and do not receive data from other nodes except CTS byte from the head node and transmit data to the head node. The nodes in head node mode consume more power than the member node mode. In order to consume the same average power in all the nodes, each node in the same cluster will become a head node at its own turn. Moreover, the protocols described herein support the integration of silent observer nodes, which do not broadcast any sync packets and can only be used to demand data from any of the nodes in the network. The interfacing of these observer nodes does not require any additional programming and any observer node connected to a terminal (a PC) can be deployed anywhere in the network, provided it does not send any synchronization packets like the sink node.

In order to set up the WSN, protocols must be implemented both at the MAC as well as on the routing layer to first establish the link level connections up to the sink node and then to route the sensed data reliably. The primary objective in WSN protocol design is to maximize the node and ultimately the network lifetime. These protocols have to ensure communications network that is robust, reliable, and flexible as well as energy conservative/efficient at the same time. The protocols must also ensure that the topology changes are well covered. The birth or death of a node must not affect the operation of the network and the data acquisition as well as the routing operations should continue in a streamlined manner. For the sink node to receive the data from all the nodes in the network, a routing protocol must be implemented such that the data is reliably propagated through the network. At the network layer, the main aim is to find ways for energy-efficient route setup and reliable routing of the data from the sensor nodes to the sink node such that the lifetime of the network is maximized.

Routing in WSNs is very different from ordinary networks due to several characteristics that distinguish them from contemporary communication and wireless ad hoc networks, such as the following.

In WSN it is not possible to build a global addressing scheme for the deployment of large number of sensor nodes. On the contrary to ordinary networks, almost all applications of sensor networks require the flow of sensed data from multiple regions (sources) to a particular sink.

The most important factor is that sensor nodes are tightly constrained in terms of transmission power, on-board energy, processing capacity and storage and thus require careful resource management. Due to such differences, the present wireless sensor network with energy efficient protocols employs new algorithms solving the problem of routing data in sensor networks. The present network, thus, utilizes the networking protocols discussed below and relies on the following assumptions.

The network is assumed to be static, i.e., the nodes are stationary and will remain in the same physical position throughout the lifetime of the network. All the nodes have same energy reserves, i.e., they are running on exactly the same type of batteries. The nodes are placed/scattered randomly in the field and the nodes form the network and later organize themselves automatically. The sink node has unlimited power supply, therefore power conservation techniques need not apply to the sink. The coverage of the sink node is assumed to be all over the network. In other words, all the nodes can hear the packets transmitted by the sink. Only the member nodes are responsible for sensing. The CH nodes do not perform sensing and serve for relaying and routing the data packet from sensing nodes towards the sink node. The member nodes communicate in Unicast only with their corresponding CHs. The keep alive messages are not acknowledged. For demonstration purposes and due to the limited number of nodes available, it is assumed that all the nodes are grouped in maximum of 10 clusters distributed in 5 levels (although the values of the power levels can be any of the 11 allowed levels. We have also assumed that only two clusters can lie at any single power level However, the implemented networking protocols are totally flexible and can be programmed to support much larger area and number of nodes/clusters, if required.

The current settings of the system and network are as follows. These settings can be modified very easily in the system software any time depending upon the particular requirements of the application for which the WSN is being employed. All nodes are identical and act both as sensing node and act as CH on their turn. The network topology is of cluster based. The sink node broadcast the beacon signal at every 4 sec. At startup, every node waits for five seconds before deciding whether it should declare itself as a new cluster head or to join an existing cluster as a member. The received signal' strength indicator (RSSI) value threshold is −5 dBm. The member nodes send keep-alive messages to their CH once every cycle. The duration of the cycle of all the nodes in the network is 4000 ms or four seconds. A cluster head remains ON for 300 ms and steeps for 3700 ins or 3.7 seconds. The member nodes are awake for 100 ms and asleep for 3900 ms or 3.90 seconds, thus keeping the same duration of the cycle as that of the cluster heads. The responsibility of CH is shifted to other members of the cluster after every 10 cycles or forty seconds. The cluster ID is generated by the first CR by padding 0 to its own hard-coded node ID. This cluster ID is maintained by all the nodes throughout the cluster life. The communication between the member node and CHs occurs at the lowest transmission power of the transceiver (mode 1) whereas for inter-CH communications, a higher transmission power level (mode 3) is used. If a CH does not receive a keep-alive from a particular node for more than 3 cycles, it is considered dead and is removed from the cluster table. After the rotation of the CH, the routing tables are updated within five seconds. The data is relayed from the sensing node to the sink node by multi-hop dynamic routes. In the main synchronized network, the environment attributes are being sensed continuously/periodically and being relayed to the sink on a regular basis. In the unsynchronized portion of the network, the nodes keep sensing the environment on continuous basis but report the values only in case of a predefined incident. Routing tables are updated after every twenty seconds. The levels once assigned to a node will remain constant during the lifetime of the node.

Figure 5:
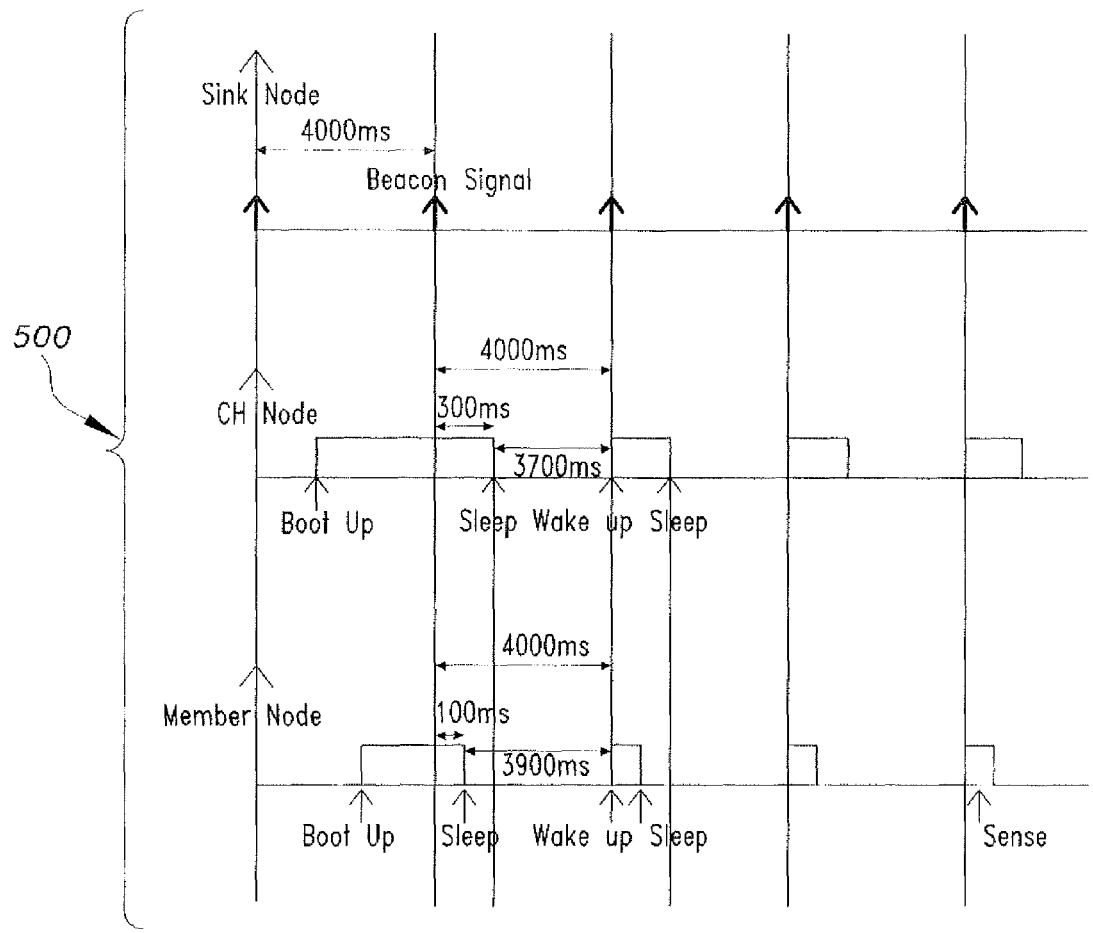
FIG. 5 is a timing diagram of CH node and member node duty cycles of the wireless sensor network with energy efficient protocols according to the present invention.

Plot 500 of FIG. 5 shows the complete timing process graphically. The sink node sends the beacon periodically after every four seconds. When a node wakes up it listens for five seconds, receives the beacon and declares itself head by broadcasting the keep-alive and sleeping after 300 ms. Similarly a member node on boot-up receives the keep alive of the CH and goes to sleep after 100 ms as indicated.

As mentioned above, the MAC protocol' that wireless sensor network with energy efficient protocols actually uses has many ideas from the S-MAC protocol. Several factors were not mentioned in the literature and have been devised to accomplish the desired tasks.

The choice to go for hierarchical-based protocol was made to simplify the data routing process. If peer-based routing was selected, then every sensor node had to know every other sensor node in its surrounding causing memory wastage in updating and maintaining node tables. In hierarchical-based protocols, only the head maintains the address tables of its peers, and the member nodes do not need to have any tables. During the implementation of the MAC and network protocol we have made the following assumptions that have to be considered while understanding the operation of our network:

As suggested in S-MAC protocol, there are two types of packets in the inventive implementation; namely, control packets and data packets. The specific format of these packets has not been defined in S-MAC and therefore the payload structure of each of these packet types is defined depending on the intended application's need and requirements. The packets are parsed into two sections; namely, the header part and the payload part. The header section of the packet is created by the transceiver and we don't have control over it. Different fields for different operations are defined in the payload section of the packet both in the control packet and in the data packet.

Control packets are the packets that are responsible for setting up the point-to-point links and clusters, establishing the network topology and ensuring smooth and reliable data transfer between the nodes. The control' packets are obviously overhead for the network operation and ultimately decrease the effective throughput of the system. Therefore, they are desired to be minimally transmitted and only if/when required. Since there is no data in these packets, preferably they should be made as small as possible so that the least energy is wasted for the transmission of this packet type. The format of the control packets is shown in Table 2. It is a 16 bytes packet with the header of 13 bytes long and the remaining 3 bytes are used in different scenarios for different purposes as explained below.

TABLE 2

Control Packet Format

| Byte number | Function | Type |
| --- | --- | --- |
| 1, 2 | Packet start identifier | Radio Header |
| 3 | Leading zeros | Radio Header |
| 4, 5 | Destination ID | Radio Header |
| 6, 7 | Source ID | Radio Header |
| 8 | Payload Length | Radio Header |
| 9 | Group ID | Radio Header |
| 10 | Message type | Radio Header |

TABLE 2-continued

Control Packet Format

| Byte number | Function | Type |
| --- | --- | --- |
| 11 | Cluster ID (CID) | Radio Header |
| 12 | Node level (NL) | Radio Header |
| 13 | Identifier | Radio Header |
| 14, 15 | Checksum | Radio Header |
| 16 | Packet end identifier | Radio Header |

Cluster ID (CID) (1 byte): This field in the packet identifies the cluster ID of the sending node. Each cluster has a unique ID assigned by its first cluster head (CH) at the time of the birth of the new cluster and all the nodes belonging to that cluster are identified by the cluster ID.

Level (L) (1 byte): This field identifies the hierarchical position of the cluster in the routing tree. To enable routing of the packets to the sink node, each cluster assigns itself a power level. This is discussed in more detail in the routing protocol implementation.

Type (T) (1 byte): This field acts as an identifier for the type of the control packet. It distinguishes between the different types of control packets that we have formulated. Table 3 gives the details of all the control packet types, their use in the network formation and maintenance and their corresponding values in the T field.

Sensing Node ID (NID) (1 byte): This field carries the ID of the sensing node. This unique ID is assigned to each node at boot-up and is hard-coded inside every node. Each node is given a unique ID that is not repeated in the remainder of the network. Intermediate Node ID (IID1-IID5) (5 bytes): These 5 fields are used to convey the complete route information the packet traverses from the sensing node to the sink. In the current implementation, we have programmed the system to operate for a maximum of six hops including the hop from the sensing node to the CII. If the packet reaches the sink with less than six hops, the remaining corresponding fields are set to zero; otherwise, the fields have the node IDs of all the intermediate heads that relay the data packet. Sensing Node Level (1 byte): This field contains the assigned power level of the sensing node.

Intermediate Node Level 1 (IL1-IL5) (5 bytes): These fields provide the power levels of the intermediate CHs.

TABLE 3

Control Packet Type

| Type Field Argument | Packet Type | Flow Direction |
| --- | --- | --- |
| 0x00 | Keep alive within a cluster | CH to member nodes |
| 0x01 | Keep alive packet between CHs | CH to other CHs |
| 0x0A | RTS | Sending node to receiving node |
| 0x0B | CTS | Receiving node to sending node |
| 0x0C | CH control transfer request | Sent from current CH to the new CH |
| 0x0D | CH control transfer response | Sent from the new CH to current CH |

The data packet is used to carry the data, from the sensing member node to the corresponding CH, and subsequently from the CH to CH until the data reaches the sink node and ultimately received by the server. The complete length of the data packet is 31 bytes including the header and the payload.

The header is 13 bytes tong and the remaining portion of the packet is the payload that we have formulated according to our requirements.

We have used the payload part of the data packet not only to carry the sensed data but also to carry the routing information along the route (for the debugging purpose only) as well as to display the routing information on the front-end application (for the demonstration purposes only). In the practical' deployment of the network, most part of this routing information is not needed and thus the packet size can be reduced to just 4 bytes required for storing light and temperature data. The format of the data packet is shown in Table 4.

TABLE 4

Data Packet Format

| Byte number | Function | Type |
|---|---|---|
| 11, 12 | Temperature value (Temp) | Payload |
| 13, 14 | Node level (NL) | Payload |
| 15 | Hop count (HC) | Payload |
| 16 | Cluster ID (CID) | Payload |
| 17 | Sensing node ID (NID) | Payload |
| 18 | Intermediate node ID 1 (IID1) | Payload |
| 19 | Intermediate node ID 2 (IID2) | Payload |
| 20 | Intermediate node ID 3 (IID3) | Payload |
| 21 | Intermediate node ID 4 (IID4) | Payload |
| 22 | Intermediate node ID 5 (IID5) | Payload |
| 23 | Sensing node level (SL) | Payload |
| 24 | Intermediate Node Level 1 (IL1) | Payload |
| 25 | Intermediate Node Level 2 (IL2) | Payload |
| 26 | Intermediate Node Level 3 (IL3) | Payload |
| 27 | Intermediate Node Level 4 (IL4) | Payload |
| 28 | Intermediate Node Level 5 (IL5) | Payload |

The definitions and descriptions of different fields of data packet in the payload part of the data packet are explained below.

Temp and Light (4 bytes): These two fields constitute the data field jointly. The Temp field contains the sensed value of the ambient temperature and the light field contains the sensed reading of light intensity.

Hop Count (HC) (1 byte): This field serves the purpose of indicating the hop count of the packet at a particular intermediate node. The hop count enables to easily and quickly fill in the next node ID in the packet without reading the complete packet. For example, if the hop count is 2, this means the packet has already traveled two hops, so the next address is placed at IID-3 without reading the complete address path.

Cluster ID (CID) (1 byte): This field in the packet identifies the cluster ID of the sending node. Each cluster is has a unique ID assigned by its first CH at the time of the birth of the new cluster and all the nodes belonging to that cluster are identified by the cluster ID.

Sensing Node ID (NID) (1 byte): This field carries the ID of the sensing node. This unique ID is assigned to each node at boot-up and is hard coded inside every node. Each node is given a unique ID that is not repeated in the remainder of the network.

Intermediate Node ID (IID1-IID5) (5 bytes): These 5 fields are used to convey the complete route information the packet traverses from the sensing node to the sink. In the current implementation, we have programmed the system to operate for a maximum of six hops in including the hop from the sensing node to the CH. If the packet reaches the sink with less than six hops, the remaining corresponding fields are set to zero; otherwise, the fields have the node IDs of all the intermediate heads that relay the data packet.

Sensing Node Level (1 byte): This field contains the assigned power level of the sensing node.

Intermediate Node Level 1 (IL1-IL5) (5 bytes): These fields provide the power levels of the intermediate CHs.

With respect to scheduling control, similar to the S-MAC, the inventive wireless sensor network with energy efficient protocols implements a coordinated sleeping of the nodes to conserve the power. The sink node serves as the data collection center and also the schedule synchronization source of the network. The sink node is connected via USB port to the Network Monitoring Server for the onward processing of the received data and monitoring of the network status. All the nodes in the network are synchronized with the sink node.

Since the sink node is assumed to have unlimited amount of power, the transmission of the beacon signal is done at the maximum available power level of the radio. The sink node transmits a broadcast beacon signal once every cycle, i.e., once in every 4 seconds. This beacon signal prompts all the nodes in the network to sleep after predefined time and at the same time provides a counter value. At the time of startup, all the nodes are randomly placed. When the first node wakes up, it receives the beacon signal from the sink. Upon receiving this packet from the sink, the CHs adjust their timers such that they go to sleep 300 ms after the reception of the beacon signal while the member nodes sleep after 100 ms of the reception of the beacon signal. This means that the duty cycle for the CHs is 300/4000 and the duty cycle for the member nodes is 100/4000.

The wake time for the CHs is chosen to be larger than the member nodes because the member nodes simply need to sense the data and pass it on to the corresponding CH. But the CHs not only have to receive data from multiple member nodes, they also have to take part in the data relaying and routing process. Therefore, they must keep awake for longer time compared to the member nodes. The beacon signal has a countdown value that is decremented in each subsequent signal by 4, which indicates the time 'left until the CH responsibility shifts to another node. Therefore, all the new nodes that boot up later in the network are also tuned to the cluster-shifting schedule.

Figure 6:
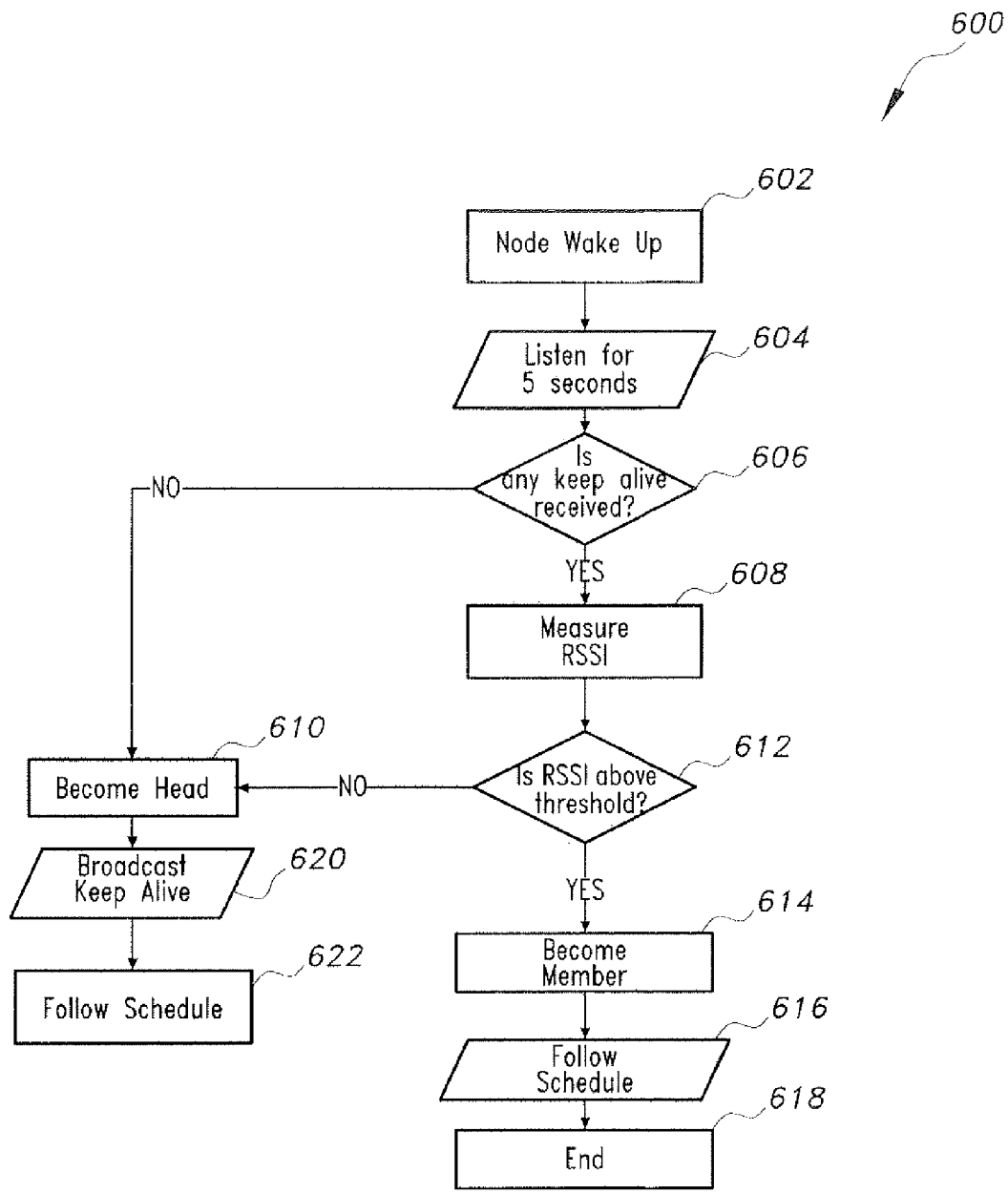
FIG. 6 is a flowchart showing a sensor node bootup process of the wireless sensor network with energy efficient protocols according to the present invention.

The link formation process 600 is represented in the flowchart of FIG. 6. At the time of startup, a node wakes up at step 602 and checks for the existence of any neighboring CHs at step 604. This node waits for 5 seconds and step 606 is performed in which if the node does not receive any signal from any nearby node, then at step 610 it declares itself a CH of a new cluster, otherwise, if the newly awakened node receives keep alive control signal from an existing cluster head, at step 608 it measures the signal strength and at step 612, if the signal strength is below the threshold it proceeds to perform step 610 wherein it discards the signal from the other cluster head and assumes that it has to make its own cluster by declaring itself the head of that new cluster. This decision is made depending on the threshold values of the received signal strength indicator (RSSI) of the received keep alive control packet. More specifically, when any wireless node receives the signal it measures the power of the received signal by reading RSSI register of the CC2420 Transceiver. CC2420 has this built-in RSSI providing a digital value that can be read by the microcontroller from the 8-bit register. If the RSSI value is less than −5 dBm, it is considered that the new node is physically sufficiently away from the CR that it is better to form a new cluster instead of joining that existing cluster. This means that the new node must form a new cluster and become the CH. The threshold value of −5 dBm has been selected after extensive experimentation and has been found to be optimum for a typical indoor environment.

If the node receives control signal from an existing CH and the signal strength is above the threshold, then at step 614 it joins that cluster as a member and assigns itself the cluster ID of that head. More specifically, if the RSSI of the received keep-alive control packet is greater than −5 dam, then this new node becomes member of that cluster and adopts the cluster ID that it receives in the control packet. If a node receives signals from two or more CHs it joins as a member of the cluster whose head is nearer to it by measuring the signal strength of their keep alive signals and comparing their power indications. In step 616, each member follows the aforementioned scheduling control for members. In step 620 a newly formed CH broadcasts a keep alive signal. In step 622 the CH then follows the scheduling control applicable to CHs. At step 618 the sensor node boot-up process terminates.

Regarding cluster formation, as other cluster heads wake up they start following the same wake-up schedule which synchronizes them with the timing of the network. With the course of time more clusters can be formed as well as more member nodes can join the clusters and population of the cluster as well as the network grows.

The cluster ID is generated by multiplying the node ID of the first cluster head node by 10. This scheme of generating cluster IDs permits the support of a large number of clusters. During the whole operation of the network, all the nodes keep this same cluster ID. Each of the CHs create and maintain a cluster table that has the node IDs of its members. This table is created after receiving the keep-alive packets from the member nodes and is used to select the next CH in the rotation. The next CH is selected as the node that has the next lower cluster ID than the current CH. In other words CHs are selected based on descending order of node IDs of all the entries of the cluster tables. If a CH does not receive a keep alive from a particular node for more than 3 cycles, it is considered dead and is removed from the cluster table. New entries are added and old ones are refreshed and updated as the keep-alive messages are received.

The cluster tables are formed and maintained by the CHs only and the member nodes don't need to maintain these tables. When a CH becomes the member node after the cluster rotation, it flushes the clusters table it was keeping and the new CH starts building its own cluster table.

Every CH broadcasts a keep alive packet in each alternate cycle (i.e. after every 8 s). The purpose of this keep alive is to tell the immediate neighboring CH nodes about the presence of this node and to keep its entry in the routing table entries. As a result, each of the CHs refreshes and maintains a routing table to select the proper route. All the member nodes within a cluster regularly (once in three cycles, i.e. every 12 seconds) sense the temperature and light of the environment and send the raw data to their respective CHs soonest as per the multiple access algorithms. In addition to that, the member nodes also send the keep-alive message to their corresponding CHs once every cycle to help the CH to update its duster table. It should be noted that the member nodes send data only to their assigned CH (Unicast communication) and not to other Once the cluster head gets the data, it routes the data towards the base with the help of the intermediate CHs.

The transmission power of the transceiver CC2420 radio unit can be adjusted at different settings. For the sake of conservation of the energy used in the transmission power, the communications between member nodes and the CH have been programmed at lowest transmission power (mode 1) of the transceiver so that only the concerned nodes within the cluster get the data with full conservation of power. For inter cluster head communications, a higher transmission power level (mode 3) is used in order to give cluster heads more coverage as they need to communicate with other cluster heads at further distances.

Regarding channel contention and Multiple Access Control in the present invention's implementation, the member nodes sample the temperature and light sensors every 12 s and send the sensed values to their CHs. But because of the wireless medium and multiple candidates' contention for transmission, every node must check whether any signal is present on the wireless channel or not so that collisions can be avoided. This is done both by physical and virtual carrier sense as explained below.

In physical carrier sensing, the node scans the channel physically to check the presence of any signal. If the channel is found to be busy, the node backs off and tries again in the next cycle. On the other hand, in virtual carrier sense, the node during its wake time listens to the transmissions in its vicinity. When it receives a frame destined for another node it extracts the duration field value (containing the remaining time to finish the current transmission) from the frame and puts it in the NAV register and starts decrementing it. A member node takes decision to send a control or data packet only when the NAV is decremented to zero and at the same time the physical carrier sensing also turns up negative. Similar procedure is followed when the packet is passed from one head node to another head node for relaying the data towards the sink node.

The virtual carrier sensing is performed before the physical carrier sense. Since physical carrier sensing involves powering ON the radio and actually listening to the channel therefore this step consumes more power as compared to the virtual carrier sensing. Therefore, it has been decided to carry out virtual carrier sensing to decrease the probability of finding the channel busy and only proceed with the physical carrier sensing to ensure that there is no transmission in the neighborhood and the channel is free.

With respect to data transfer, once the data is sensed by the sensing node and is available for transmission after making sure the wireless channel is free, the sensing node sends a Unicast RTS packet to its CH. When the RTS is received by the CH, depending on whether the CH node is free or not, the CH responds by sending a Unicast CTS packet to the corresponding sensing node. Upon receiving the CTS, the node transmits the data packet to the CH. After the successful delivery of the data the CH sends the ACK signal to the member node to confirm that it has received the data properly. If the intended receiver does not receive the packet for some reason such as collision, the ACK is not received by the member node and the contention process is repeated again. The same procedure is followed for the data transfer from one CH to another CH.

Figure 7:
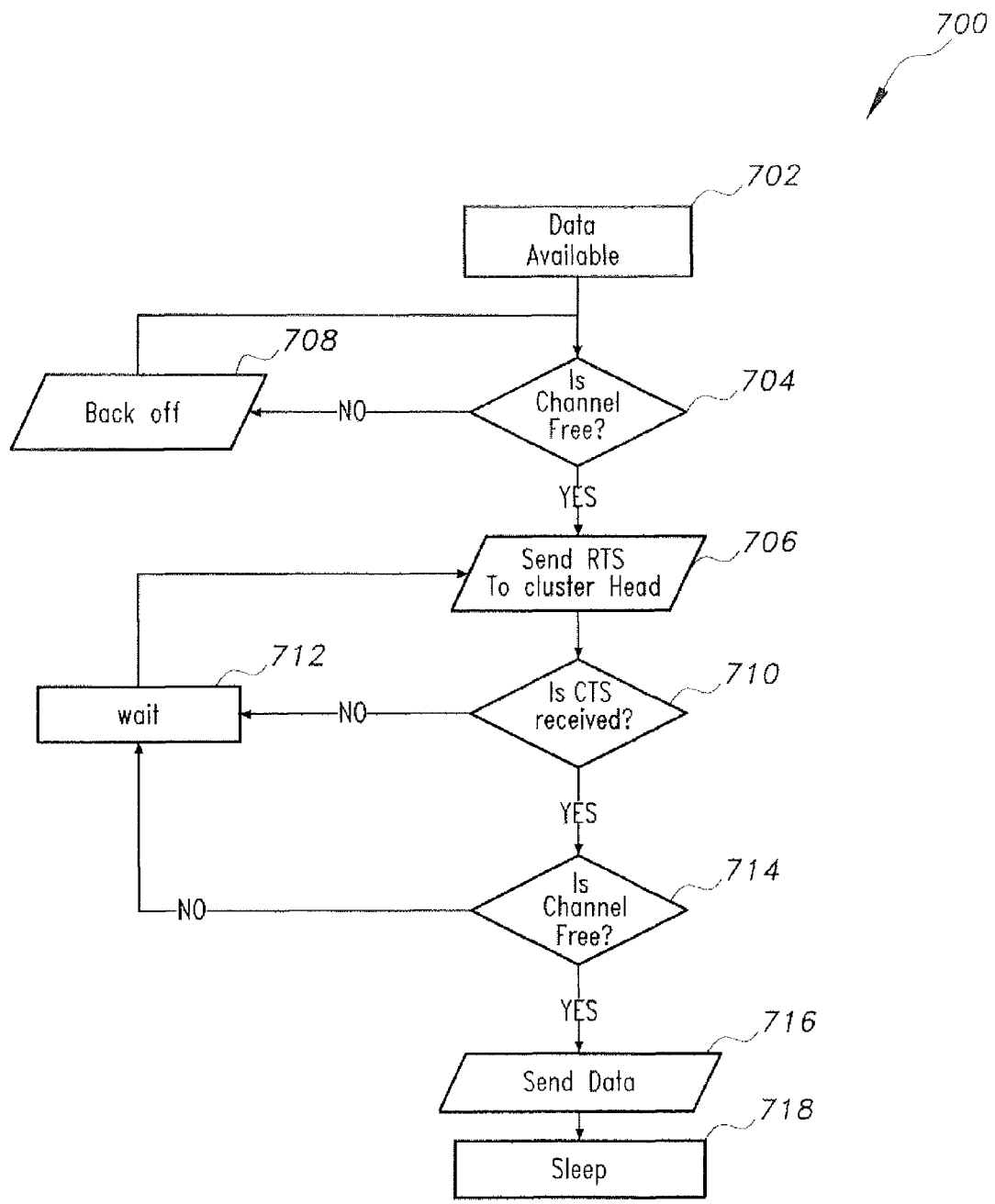
FIG. 7 is a flowchart of member node channel contention logic during data packet sending in a wireless sensor network with energy efficient protocols according to the present invention.

The flowchart in FIG. 7 shows the implemented MAC protocol 700 of the wireless sensor network. Steps of MAC protocol 700 include a data available step 702, a check to see if the channel is free 704, a suspend transmission step 708, and a Request To Send step 706 addressed to the cluster head (CH). A Clear To Send received check step 710 is then performed, and the Member Node waits until the CTS is received, At step 714 the Member Node (MN) checks again for a free channel and waits at step 712 until the channel is free. The MN then sends the data at step 716 whereupon the MN subsequently returns to sleep at step 718.

To ensure that the whole message is transferred during the wake interval' of the nodes, a check has been added to ensure that the intended recipient node sends the CTS only if there is sufficient time available in the wake period to complete the transaction. If there is insufficient time to complete the communication, the intended recipient does not send the CTS and the sensing node contends for the channel again in the next wake period.

Regarding Head Rotation Operation, as mentioned earlier, in order to balance the power consumption among the nodes in a cluster, the cluster head responsibility is rotated every 10 cycles, i.e., every 40 s. This is performed in a descending order of the node IDs of the member nodes in the cluster table. Two special types of control packets called the handshaking packets (Table 4.2) are exchanged between the CH and the member nodes for handshaking of the CH responsibility handover rotation.

Once the switch over of CH takes place, the new CH listens to the keep alive messages of the neighboring CHs as well as the keep alive messages of the member nodes to create routing tables and cluster tables, respectively. This process takes time that varies depending on the time taken by all the members and neighbor CH to send their keep alive packets. At the same time, the new CH also transmits its own keep alive message to alert the neighboring clusters that now it is acting as the head of the cluster and all the routing must be done through it instead of the old CH.

As the implementation details were not found during the literature survey, the inventors of this wireless sensor network with energy efficient protocols sought to devise unique methods to implement the S-MAC protocol. In the process of doing so, a protocol that was different from the S-MAC was created. Some of the most important features of the MAC protocol 700 are listed below.

1. The implementation enables the nodes to communicate with each other, the sleep times are synchronized, i.e., all the nodes sleep and wakeup at the same time. These schedules are maintained by every node, thus enabling them to know when the neighboring node will be awake so that data can be sent to it. Advantageously, this approach reduces the latency of the network.

2. The network provides for the whole network having a single schedule that is controlled by the sink node and followed by all the nodes in the network. This is chosen to simplify the scheduling process as well as to have a single master clock in the network. If there are different groups of nodes trying to schedule the periodic sleeping, it will result in large timing difference among the nodes due to the natural different clock drifts speeds in different nodes processors. Moreover, the synchronization process remains robust to synchronization errors and simplifies timing requirements at the same time. Additionally, all the exchanged timestamps are relative rather than absolute.

3. In the WSN, the infrastructure is cluster-based, the member nodes communicate with their CHs only, and the data is relayed in a multi-hop routing manner by cluster heads only.

4. In the present WSN, the intended recipient node makes sure that there is enough time left in the wake period for receiving the data successfully before its sleep time and only in that case the CTS signal is sent to the sender. This again simplifies the whole operation as the schedules remain undisturbed.

It should be understood that S-MAC protocol does not restrict on using a predefined packet structure and leaves this on the specific implementation. This provides the flexibility to use custom-designed payload structures according to requirements of the WSN.

The present WSN implements a routing layer protocol that differs from LEACH and TEEN protocols in the following ways. With respect to the inventive network topology, the sink node has a constant power supply and therefore has no energy constraints. It can transmit with high power to all the nodes. Thus, there is no need for routing mechanism from the sink node to any wireless network node. However, the wireless network nodes are assumed to be far away from the sink node and because of their power constraints it is not feasible to communicate directly to the sink node.

As shown in FIG. 4, the network topology is of a clustered-type multi-hop routing similar to the LEACH protocol. The exemplary topological model 400 comprises clusters 402a, 402b, 402c, and 402d, each having a number of nodes. In each cluster at any given time, one node acts as a cluster head (CH) (e.g., nodes A, B, C, and D), whereas the remaining nodes are the member nodes in that cluster (e.g., nodes A-1, A-2, B-1, B-2, etc.). Only the member nodes perform the data sensing and the CHs are responsible for receiving the data from the member node and routing it reliably and efficiently to the sink node S.

The CH is programmed to be dynamically rotated based on the head rotation operations criteria defined above. The head responsibility rotates among the member nodes in order to balance the power consumption load between all member nodes equally.

Regarding the network tree and routing tables, during the network setup phase, a logical network tree is created which comprises of all the clusters placed at different power levels. These levels indicate the depth of the tree relative to the sink node. To decide the levels, the sink or base node (S) regularly broadcasts a beacon signal. When any wireless node receives the beacon signal, it measures the power of the received signal by reading RSSI register of the CC2420 Transceiver. CC2420 has this built-in RSSI providing a digital value that can be read by the microcontroller from the 8-bit register.

Depending upon the received value of RSSI, every cluster head node assigns itself a level. To assign the levels to corresponding RSSI values, ranges have been defined so that an adequate number of levels are created. The resolutions of the RSSI have been carefully defined after a large number of experimentation and testing and are shown in Table 5.

TABLE 5

Cluster Head Levels

| RSSI Range in dBm | Assigned Level |
| --- | --- |
| $RSSI \geq 0$ | 1 |
| $-10 < RSSI \leq -1$ | 2 |
| $-13 < RSSI \leq -10$ | 3 |
| $-16 < RSSI \leq -13$ | 4 |
| $-19 < RSSI \leq -16$ | 5 |
| $-22 < RSSI \leq -19$ | 6 |
| $-25 < RSSI \leq -22$ | 7 |
| $-28 < RSSI \leq -25$ | 8 |
| $-31 < RSSI \leq -28$ | 9 |
| $-34 < RSSI \leq -31$ | 10 |
| $RSSI \leq -34$ | 11 |

It is to be noted here that if levels are assigned over narrow intervals of RSSI, a large number of levels will be created. This can produce situations in which different levels are assigned to nodes that are physically close to each other. On the contrary, if a wide interval is used, then in situations where the signal' strength doesn't vary, majority of the cluster heads will be associated to the same level. We have assigned this interval distribution after rigorous testing of the network and monitoring of the physical separation between the nodes in an indoor environment.

With respect to formation and updating of routing tables, when each of the cluster heads has been assigned a level, a logical tree structure is formed. Each cluster head keeps sending a keep alive control packet periodically in every cycle to inform the neighboring cluster heads that it is alive. In this packet, the level of the node is also broadcast. The neighboring nodes receive this message and store the node ID and the corresponding level in its routing table. In case, a node dies, and the neighboring nodes don't receive keep alive message from that node for three successive cycles, its neighbors update their routing tables accordingly by assuming it is dead and flushing its entry from their routing tables. In order to accommodate for the topology changes, the routing tables are also updated every head rotation process. This enables the network to include any new CH and to remove the CHs that have died.

During routing operation, when a CH has some data to send to the sink node it consults its routing table and selects the node which is in an upper level (i.e. a level closer to the sink). For example, considering the network of FIG. 4, the node C would have the address table given in Table 2. When node C wants to send data to the sink, it looks through the routing table and sends the packet to the node that is one level higher in hierarchy or closer (level 2) to the sink. Thus, node C will send data to Node B. Assume that node B dies due to some reason, then the next closer node (node A at level 1) will be the new recipient of data from node C, and this process continues. One important rule in this approach is that data is always sent to the CH that is at a strictly lower tree level than the current CH. This prevents data from cycling between the nodes.

TABLE 6

Node Levels

| Node ID | Level |
|---------|-------|
| A | 1 |
| B | 2 |
| D | 4 |
| S | 0 |

A CH forwards the data to the CH higher up in the tree and this continues until the data reaches the sink node S. If the sending CH has another CH on the same power level as its own, the sending CH will send only to the CH that is strictly higher in the level (Lower level number) in the tree. If the sending CH finds two CHs on the same level up in the tree, then it forwards its data to the CH whose entry is the first one found in the routing table. The protocol takes care of the changes in the topology of the network. For example, if a new node is added anywhere in the network, it either associates itself with one of the existing clusters or otherwise starts its own cluster. This new node becomes part of the routing mechanism automatically as if it has joined an existing cluster; it takes turn to become CH and ultimately becomes part of a particular routing chain. If that new node has started a new cluster then that cluster will update and may improve the already existing routes depending upon its location and existing power levels in the network.

If a node dies, it is dynamically taken care of by updating the cluster tables that ultimately reflects on the update in the routing tables as well. We also expect that the clusters closer to the sink node will exhaust their energy reserves sooner than the clusters that are relatively further away form the sink node. In that situation or for any other reason, if the whole cluster dies, the routing tables at the remaining clusters adopt this change in the routing information by updating their routing tables insuring that the process of data delivery from the alive network continues.

Regarding data delivery models of the network, there are two formations of network possible: static monitoring and dynamic monitoring. Dynamic events in most applications require periodic reporting and consequently generate regular traffic to be routed to the sink. Monitoring static events allows the network to work in a reactive mode, simply generating traffic and reporting when an incident occurs. The present network implements both approaches.

With respect to synchronized network monitoring of dynamic events, similar to LEACH, our main network acts in a proactive manner and regularly senses and forwards data to the sink node. The implemented network protocol in this part of the network takes care of this job efficiently and very robustly. All the member nodes are periodically sensing during their wake time and are sleep most of their life in order to conserve their energy reserves. The sensing nodes wakes up periodically and send the sensed data to their CH. The purpose of making our network proactive is to enable the regular reporting and monitoring of the elements in the environment.

At the same time, like TEEN, the network also has the ability to act in a reactive mode. A portion of the network may be an unsynchronized group of nodes (UGN) that operates outside the domain of the main network. These nodes remain in the sleep state (transceiver OFF, CPU at low power mode 1) most of the time. At the same time they keep sensing the environment continuously and only wakeup to report an incident if the sensed value crosses a pre-defined threshold. In contrast to the main network, these nodes do not form clusters and don't follow any time schedules. They also don't need to maintain the cluster tables, network topology and routing tables.

Once there is an incident occurrence (threshold crossing of the sensed value) ready to be reported, the node wakes up and listens for the keep alive messages from the main network. Due to the criticality of the situation that this node needs to report, this node hands over the data to the CH of the main network from which it receives the signal first, regardless of its distance and location on the network. The UGN sensing node follows all the MAC protocol procedures to contend for the channel and to deliver the data reliably to the first CH it hears from. After successful delivery of the incident, this node goes to its sleep mode again and the data is relayed to the sink node by the main network CHs according to their routing tables.

The implemented protocol differs from LEACH, which is also based on a clustered approach. With LEACH, the nodes group themselves into clusters and decide a cluster head that communicates with its peers to route data, the cluster heads changing randomly over time to balance the energy dissipation of the nodes. In contrast, the present routing protocol rotates the CHs periodically in a pre-defined manner. Moreover, in contrast to LEACH forming clusters dynamically, the present protocol utilizes the nodes to form fixed clusters that retain their membership permanently. This not only simplifies the implementation, it also results in savings of energy from the overhead of communication required for making new clusters.

Additionally, the WSN employs multi-hop dynamic routing, thus resulting in savings of transmission power required because multi-hop routing is much more energy efficient in terms of transmission power required to communicate between two nodes.

In contrast to TEEN protocol, in the present wireless sensor network, the CHs are not erected, but the responsibility is rotated among all the members evenly and periodically in order to load balance the power consumption within the cluster.

In contrast to TEEN protocol which defines only two levels of clusters, one among the member nodes and the second among the CH, the wireless sensor network defines a total of eleven cluster levels so that the network system can support large sizes of networks with small multi-hop routed communications among the CHs, thus saving substantial power for transmission.

Moreover, in the present wireless sensor network, UGN thresholds are pre-programmed in the sensing nodes. The UGNs in the network wake up only when there is some alarm that must be reported to the sink. By pre-programming the threshold levels, the UGNs do not need to wake up and listen to the sink node to receive thresholds, thus conserving power.

In summary, the present protocol is based on a clustered approach. Nodes are classified as either member nodes (MN) or cluster heads (CH). Whenever a node wakes up in the network, it listens for the beacon signal from the base station (BS) during the start-up phase and determines the RSS for the beacon. Based on the measured RSS the node selects one of the eleven distinct pre-defined network tree levels and becomes the CH. Each CH transmits a periodic keep alive (KA) packet to inform the other nodes in the network about its existence.

All the other nodes that wake up afterwards measure the received signal strength (RSS) of the beacon packet as well as the RSS of the all the keep-alives (KAs) that they receive within the start-up phase. If the RSS of any of the KAs is greater than −5 dBm, the new node decides that it is close to one of the already existing CH and elects it as its parent and becomes the MN. If the KAs are not strong enough, the node becomes a CH and selects its level from the RSS of the beacon packet. Transmission within a cluster is only from MN to CH and packets are not exchanged between MNs. This clustered approach enables all the MN of any given cluster to send their data to only their own parents (CHs). This clustered scheme avoids including next hop nodes that are physically close to each other as they become the members of the same cluster. In addition, the clustered approach requires small routing tables as each CH only needs to know its next hop CH and not the MNs.

Figure 3:
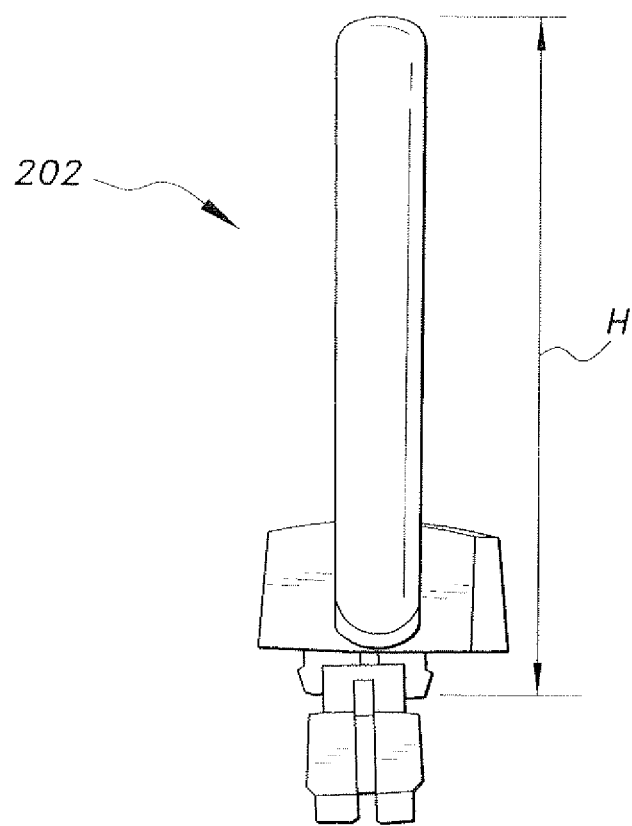
FIG. 3 is an elongate linear polarization antenna of the wireless sensor network with energy efficient protocols according to the present invention.

With respect to the hardware, the CC242OEM unit comes with an Antenova antenna 202 that has a height H of about 3.5 inches, as shown in FIG. 3. The Antenova antenna is designed to operate at 2.4 GHz with applications in WiFi, Bluetooth and ZigBee. The antenna works with linear polarization, providing a peak gain of 2.2 dBm and an 80% operating efficiency.

The wireless sensor network also employs a network monitoring application (NMA).

Figure 8:
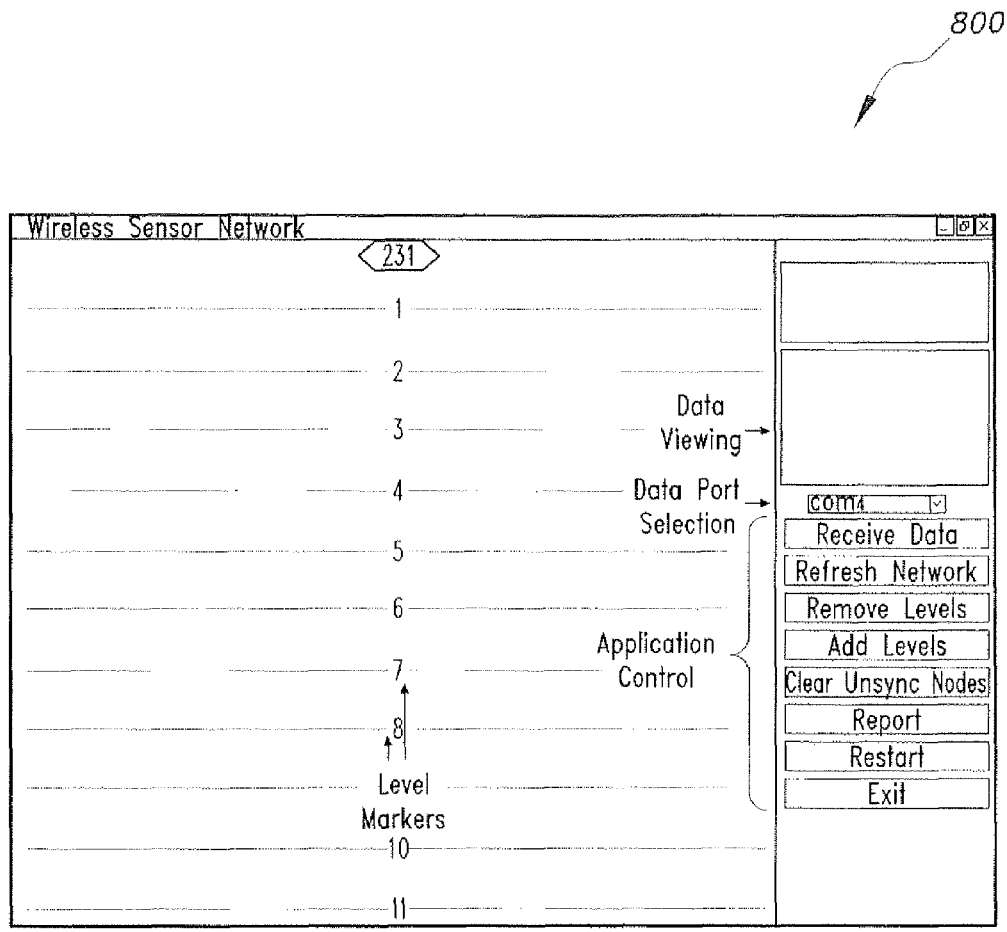
FIG. 8 is a screen shot of an NMA management tool for a wireless sensor network with energy efficient protocols according to the present invention.

As shown in the FIG. 8, the main screen 800 of the NMA comprises a network viewing pane used to display the network diagram. All the packets received by the sink node are decoded. After extracting the routing information from the received packet, the application draws the route in the network viewing space. In addition, the corresponding values of the sensed parameters (light intensity and temperature) are also displayed along the route. Within the network viewing window, eleven horizontal lines are drawn corresponding to the eleven available power levels. After receiving the packet, the levels of all the nodes throughout the path are determined and the node is drawn in the corresponding space in the network viewing window.

A Data Viewing Window portion of the NMA is used to display the light and the temperature values of the recently received packet at the sink node along with the ID of the sensing node. Although the sensed parameters are also being displayed along the node on the network, due to the congested space in the network viewing window the font size is relatively small. The received data is displayed in the data viewing window with a larger font size for ease of monitoring.

Application Control and Options portion of NMA provide different control and option available for the operation of the application. A Data Port Selector: As the server machine may have several USB ports, the port to which the sink node is connected must be selected for the operation of NMA. This dropdown menu lists all the ports available on the server machine. The administrator has to select the correct port based on the connection of the base node.

Receive Data: This button opens the input/output port for communications. The port that has been selected from the dropdown list must be opened using this button to enable communication with the sink node.

Refresh Network: This button clears or refreshes the network viewing window and the network is drawn again from scratch as packets are received.

Remove/Add Levels: These buttons invert the operation of each other. By default the network viewing window contains the power eve lines and the network is drawn around them. If viewing of the network becomes difficult due to increased number of nodes, the level lines can be removed by using remove levels and can be made visible again by add levels.

Clear Unsync Nodes: In case of alarm, unsynchronized nodes from the incident based portion of the network will start to transmit data. Only five unsynchronized nodes have been programmed to be displayed on the NMA simultaneously. Since there can be only a few unsynchronized nodes (five for this prototype system), once the administrator sees and acknowledges the alarm he can reset or turn it off by the clear Unsync button which removes the unsync node display once the alarm has been acknowledged.

Report: This button opens the report window where the history of the routes for each node can be observed in the report window.

Restart: This button restarts the complete application. The port is closed and needs to be opened again once the restart is complete.

Figure 9:
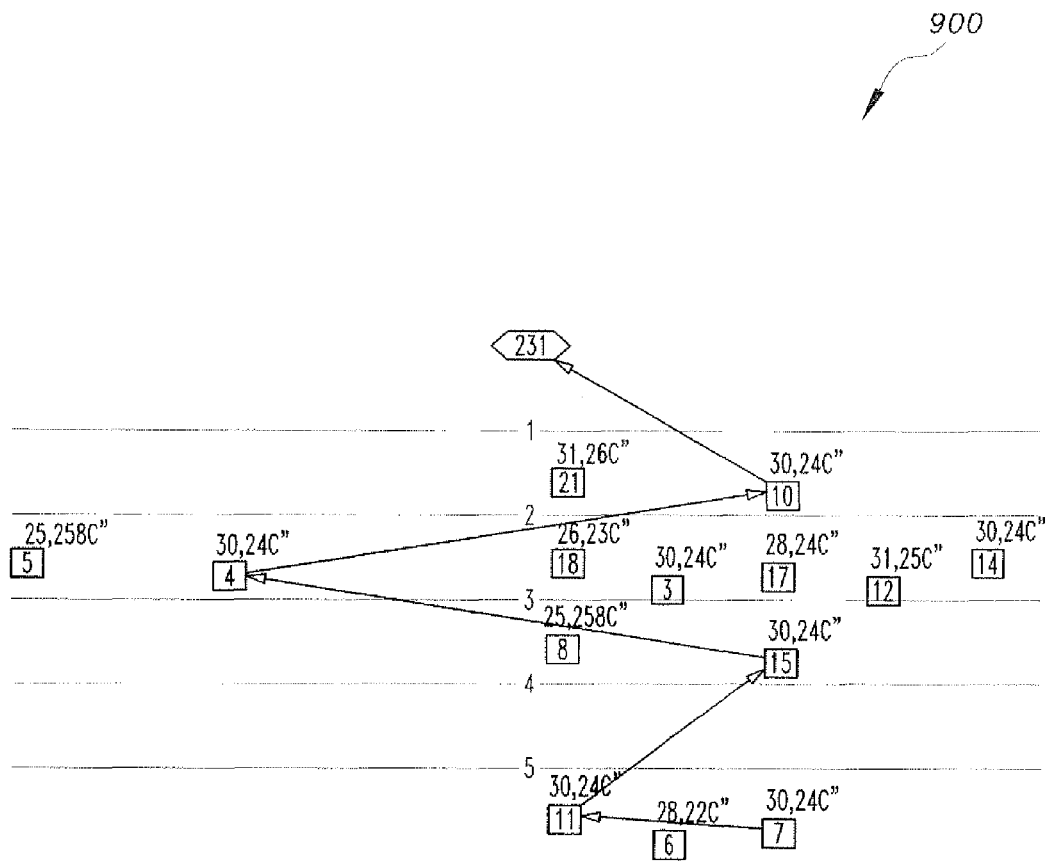
FIG. 9 is a diagram of a working NMA instance of the wireless sensor network with energy efficient protocols according to the present invention.

Exit: This button shuts clown and exists the application properly by deleting the unwanted history from the database and by closing the communications port formally. For error-free exits, the button must be utilized. FIG. 9 shows an example of a working instance of NMA. The screen displays a visualization 900 of Node 7, which routes data through cluster heads 11, 15, 4, and 10.

It is to be understood that the present invention is not limited to the embodiments described above, but encompasses any and all embodiments within the scope of the following claims.

We claim:

1. A routing protocol method in a wireless sensor network having a plurality of clusters, each of the clusters having a cluster head, the network further having a sink node, the method comprising the steps of:
   waking up a first node of the wireless sensor network, thereby energizing the first node's systems;
   having the first node listen for a first keep alive data packet on an assigned communications channel for a predetermined time period;
   constituting the first node as a first cluster head if the predetermined time period has timed out without the first node receiving the first keep alive data packet;
   after constituting the first node as a first cluster head, having the first cluster head transmit a second keep alive data packet;

having the first node measure a received signal strength indication (RSSI) if the first node received the first keep alive data packet;

having the first node compare the RSSI to a threshold value;

constituting the first node as a first cluster head if the RSSI is below the threshold value;

constituting the first node as a first member node if the RSSI is above the threshold value; and having the first node follow scheduling from a single master clock of the wireless sensor network.

2. The routing protocol method according to claim 1, further comprising having said first cluster head perform the steps of:

receiving data packets from a second member node;

serially forwarding the data packets between the cluster heads in the network for retransmission to said sink node if and only if receiving cluster heads are topologically closer to said sink node than the forwarding cluster heads in a multi-hop transmission scheme until said sink node receives said data packets.

3. The routing protocol method according to claim 2, further comprising the step of having said first cluster head periodically switch roles with said second member node in a non-random manner, whereby said second member node becomes said first cluster head and said first cluster head becomes said second member node.

4. The routing protocol method according to claim 2, wherein when a ready-to-transmit UGN (Unsynchronized Group of Nodes) node receives a keep alive transmission from one of the cluster heads, having the ready-to-transmit UGN node perform the step of transmitting its UGN node data to the cluster head that transmitted the keep alive transmission.

5. The routing protocol method according to claim 4, further comprising the step of having the cluster head receiving said UGN node data forward said UGN node data to said sink node according to said multi-hop transmission scheme.

* * * * *